United States Patent [19]
Keech

[11] Patent Number: 5,029,481
[45] Date of Patent: Jul. 9, 1991

[54] CROSS-CORRELATION APPARATUS AND METHODS
[75] Inventor: Raymond P. Keech, Stroud, England
[73] Assignee: ABB Kent PLC, Bedfordshire, England
[21] Appl. No.: 382,761
[22] Filed: Jul. 21, 1989
[30] Foreign Application Priority Data Jul. 22, 1988 [GB] United Kingdom ................ 8817500

[51] Int. Cl.$^5$ ................................................ G01P 5/20
[52] U.S. Cl. ................................ 73/861.06; 364/510; 364/569; 324/606; 324/77 G
[58] Field of Search ...................... 73/861.05, 861.06; 364/510, 569; 324/606, 77 G

[56] References Cited
U.S. PATENT DOCUMENTS

| | | | |
|---|---|---|---|
| 3,844,170 | 10/1974 | Critten | 73/861.06 |
| 3,876,947 | 4/1975 | Giraudon | 324/77 G |
| 4,131,857 | 12/1978 | Clymer | 324/77 G |
| 4,248,085 | 2/1981 | Coulthard | 73/861.06 |
| 4,257,275 | 3/1981 | Kurita | 73/861.06 |
| 4,708,021 | 11/1987 | Braun | 73/861.06 |

FOREIGN PATENT DOCUMENTS

| | | | |
|---|---|---|---|
| 0004169 | 1/1979 | Japan | 73/861.06 |
| 0979858 | 12/1982 | U.S.S.R. | 73/861.06 |

Primary Examiner—Kenneth Wieder
Assistant Examiner—Jose M. Solis
Attorney, Agent, or Firm—Browdy and Neimark

[57] ABSTRACT

An apparatus and method for processing first and second signals, the second signal representing information which is delayed in time with respect to correspoonding information represented by the first signal and there being included in the information represented by each signal information which represents a common effect, occurring at the same time, in each of the two signals. The apparatus includes correlating means which generate first data suitable for producing a positive time correlation curve from the two signals and second data suitable for producing the equivalent of a negative time correlation curve from the two signals or an autocorrelation curve from either one of the two signals. The information representing the common effect results in data common to both first and second data. One of the first and second data is therefore subtracted from the other, thereby removing or substantially reducing the information representing the common effect. The apparatus and method are particularly suited for measuring the speed of travel of a cable in a cable making machine, where lateral movements of the cable away from its desired path produce a common effect on sensors spaced lengthwise of the direction of travel.

6 Claims, 3 Drawing Sheets

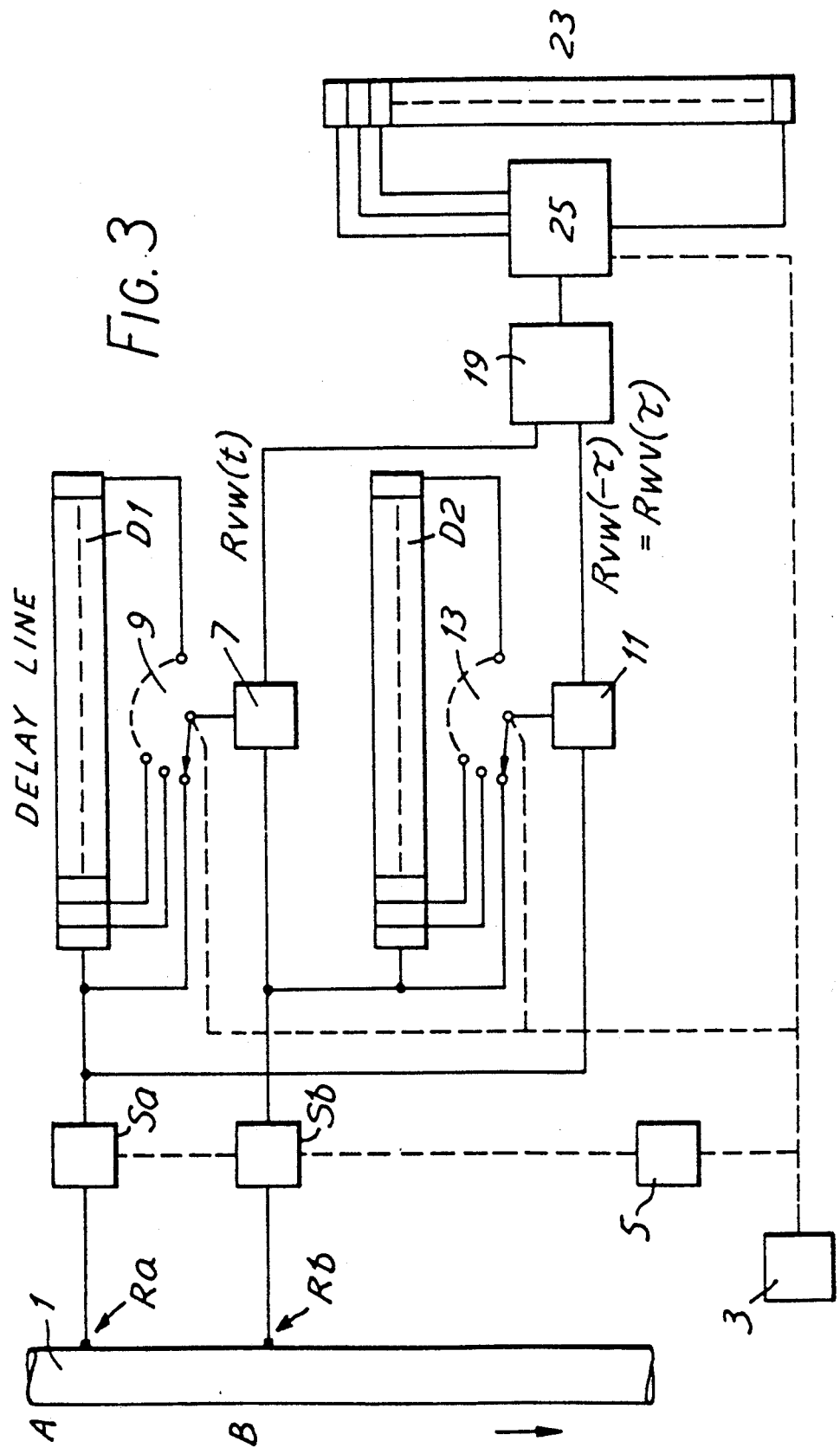

CROSS-CORRELATION APPARATUS AND METHODS

This invention relates to cross-correlation apparatus and methods.

Cross-correlation techniques are now used in many fields. In some cases the techniques are used to improve the quality of a signal corrupted by unwanted noise signals. In the majority of cases, however, cross-correlation is used to determine the time delay between two or more signals when the signal: noise ratio of the signals is poor.

The cross-correlation function $R_{xy}(\tau)$ of two signals x(t) and y(t) is given by:

$$R_{xy}(\tau) = \lim_{T \to \infty} \frac{1}{T} \int_0^T x(t + \tau) y(t) \, dt \quad (1)$$

Ideally, $R_{xy}(\tau)$ is characterised by a clearly defined peak at a value of delay $\tau_m$ equal to the time delay between the signals x(t) and y(t). Accordingly, in apparatus where cross-correlation is used to determine the speed of relative movement between two bodies or the speed of relative movement between a body and a fluid, that speed is determined by dividing the distance between locations at which the signals x(t) and y(t) are generated by $\tau_m$.

Under certain practical conditions an event or events may occur which produce an effect common to both signals x(t) and y(t).

For example, a cross-correlation apparatus has been proposed for measuring the speed at which a cable is travelling along a predetermined path. The apparatus relies on the detection of electrostatic charges present or induced on the surface of the cable. The charges are detected by two electrostatic charge sensors which are disposed at respective locations spaced in the direction of movement of the cable, ie. lengthwise of the cable. The desired variation in amplitude of each signal from a sensor results from a variation in the density of the electrostatic charge in the direction of movement. Unfortunately, however, the signal from each sensor may include components due to movement of the cable in a lateral direction ie. toward and away from the sensors. These movements produce a common effect upon both sensors, and result in what are known as "common mode interference signals".

It is an object of the invention to reduce the unwanted effect of common mode interference signals in cross-correlation apparatus and methods.

According to the invention there is provided apparatus for processing a first signal and a second signal, the second signal representing information delayed in time with respect to corresponding information represented by the first signal, and there being included in each signal a common mode interference signal, the apparatus comprising correlating means for generating first data suitable for producing a positive time correlation curve from the first and second signals and second data suitable for producing the equivalent of a negative time correlation curve from the two signals or an autocorrelation curve from one of the two signals, there being included in the first and second data common data which results from the common mode interference signals, and a means for substracting one of the first and second data from the other of the first and second data, whereby the data resulting from the the said common mode interference signals is removed or reduced.

The apparatus may be designed for use in measuring the velocity of relative movement between first and second bodies or between a first body and a fluid, in which case the apparatus further comprises first and second detectors which are each adapted to sense noise signals representing disturbance in the fluid or on the second body and which, in use, are mounted at respective locations on the first body which are mutually spaced in a direction parallel with the direction in which the said relative movement takes place, and the first and second signals are noise signals detected by respective first and second detectors.

According to the invention there is also provided a method for processing a first signal and a second signal, the second signal representing information delayed in time with respect to corresponding information represented by the first signal, and there being included in each signal a common mode interference signal, the method comprising generating first data suitable for producing a positive time correlation curve from the first and second signals, generating second data suitable for producing the equivalent of a negative time correlation curve from the two signals or an autocorrelation curve from one of the two signals, there being included in the first and and second data common data which results from the common mode interference signals, and subtracting one of the first and second data from the other of the first and second data, whereby the data resulting from the said common mode interference signals is removed or reduced.

The method may be designed to measure the velocity of relative movement between first and second bodies or between a first body and a fluid, which case the first and second signals are respective first and second noise signals representing disturbances in the fluid or on the second body, the first and second noise signals being detected at respective locations on the first body which are mutually spaced in a direction parallel with the direction in which the said relative movement takes place.

In a case where an apparatus according to the invention is designed for use in measuring the speed of travel of a cable, the said disturbance may be electrostatic charges on the surface of the cable and the first and second detectors are then electrostatic charge sensors.

In a case where the apparatus is designed for use in measuring the flow rate of a fluid, ultrasonic, nucleonic or electromagnetic transmitters and receivers may be used to sense disturbances in the fluid.

The invention will now be described, by way of example, with reference to the accompanying drawings, in which FIG. 1a shows signals having no common mode interference and FIG. 1b shows a cross-correlation function obtained from these signals by known apparatus;

FIG. 3 and 4 show a cross-correlation apparatus according to the invention.

Figure 1A:
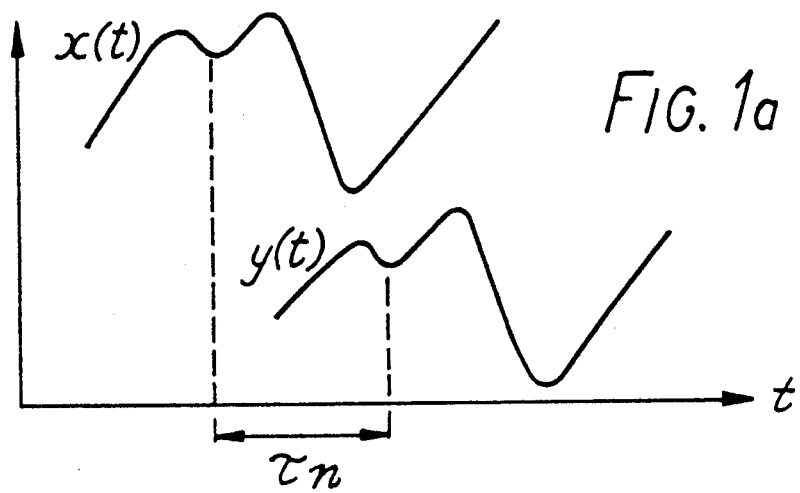
Figure 1B:
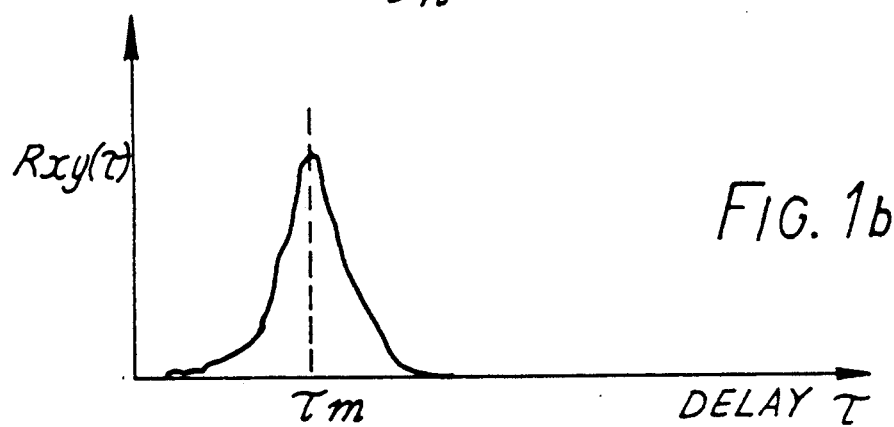

Referring to FIG. 1 of the drawings, FIG. 1a shows a first signal x(t) and a second signal y(t) which represents the same information as the information represented by the signal x(t) but which is delayed by a time $\tau_m$ with respect to the signal x(t). There is no common mode signal. FIG. 1b shows the cross-correlation function $R_{xy}(\tau)$, which is obtained by cross-correlating the two signals in a known apparatus.

Figure 2A:
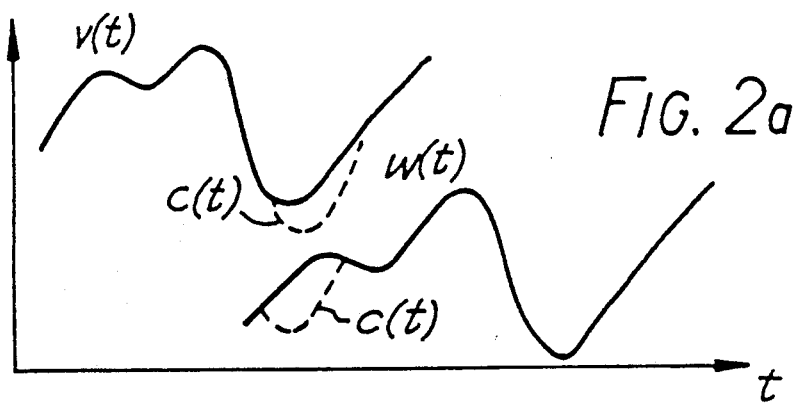
FIG. 2a shows signals having common mode interference and FIG. 2b shows a cross-correlation function obtained from these signals by known apparatus.
Figure 2B:
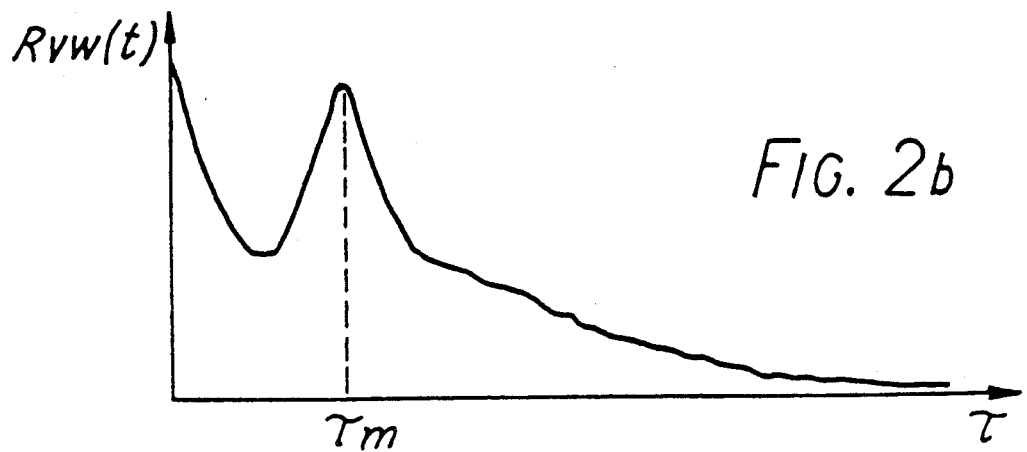

Referring now to FIG. 2 of the drawings, FIG. 2a shows signals v(t) and w(t) which are similar to the above signals x(t) and y(t), respectively, except that the information represented by each of the signals v(t) and w(t) includes information representing an undesired common effect, occurring at the same time, on each of the signals ie. a common-mode interference signal c(t). The resulting cross-correlation function $R_{vw}(\tau)$, obtained by cross-correlating with known apparatus, is shown in FIG. 2b. It will be noted that the common mode signals produce a common-mode peak which is close to, and in some cases may mask, the true cross-correlation peak at the time $\tau_m$.

The present invention is designed to substantially reduce or virtually eliminate common mode interference in a cross-correlation function by subtracting from a normal correlation function $R_{vw}(\tau)$ a negative time correlation function $R_{vw}(-\tau)$.

The mathematical analysis below shows that under practical measurement conditions $R_{vw}(\tau)-R_{vw}(-\tau)$ is equivalent to the desired signal $R_{xy}(\tau)$ around $\tau_m$.

Thus, the signals v(t) and w(t) shown in FIG. 2a of the drawings are given by $$v(t) = x(t) + c(t) \quad (2)$$

$$w(t) = y(t) + c(t) \quad (3)$$

where x(t) and y(t) are the signals without common mode interference and c(t) is the common mode interference signal.

The cross-correlation function $R_{vw}(\tau)$ of the signals v(t) and w(t) is given by $$R_{vw}(\tau) = R_{xy}(\tau) + R_{cc}(\tau) + R_{xc}(\tau) + R_{yc}(\tau) \quad (4)$$

The terms $R_{xc}(\tau)$ and $R_{yc}(\tau)$ are very small in relation to other terms. Accordingly, $$R_{vw}(\tau) = R_{xy}(\tau) + R_{cc}(\tau) \quad (5)$$

The cross-correlation curve $R_{vw}(\tau)$ obtained from the signals v(t) and w(t) is therefore a superposition of the desired function $R_{xy}(\tau)$, and the autocorrelation function of the common mode signal $R_{cc}(\tau)$.

We can now consider the function $R_{vw}(\tau) - R_{vw}(-\tau)$. This function is given by $$R_{vw}(\tau) - R_{vw}(-\tau) = R_{xy}(\tau) + R_{cc}(\tau) - R_{xy}(-\tau) - R_{cc}(-\tau)$$

Now, $R_{xy}(-\tau) < R_{xy}(\tau)$ around the region of interest where $\tau = \tau_m$.

Also, $R_{cc}(-\tau) = R_{cc}(\tau)$

Accordingly, $R_{vw}(\tau) - R_{vw}(-\tau) = R_{xy}(\tau)$

Thus, the desired cross-correlation curve $R_{xy}(\tau)$ can be obtained from the function $R_{vw}(\tau) - R_{vw}(-\tau)$, above, the common mode interference signal being virtually eliminated. In other words, by cross-correlating in both positive and negative time, and then subtracting the negative-time cross-correlation function from the positive-time function, the desired function $R_{xy}(\tau)$ is obtained.

In practice $$R_{vw}(-\tau) = R_{wv}(\tau)$$

Thus, $R_{xy}(\tau) = R_{vw}(\tau) - R_{vw}(-\tau) = R_{vw}(\tau) - R_{wv}(\tau)$ This means that $R_{xy}(\tau)$ can be obtained by first cross-correlating the signals v(t) and w(t) in positive time, the signal v(t) being subjected to variable delays, then cross-correlating w(t) and v(t) in positive time, the signal w(t) being subjected to variable delays, and finally subtracting the second of these cross-correlation functions from the first.

FIG. 3 of the drawings shows a cross-correlation apparatus according to the invention which is designed for use in measuring the speed at which cable emerges from a cable-making machine.

The apparatus of FIG. 3 includes a horizontally extending guide (not shown) along which a cable 1 is driven. The cable travels in a direction from top to bottom of FIG. 3. During the course of this movement, electrostatic charges are induced on the surface of the cable.

Adjacent to the path traversed by the cable 1 as it moves along the guide are two sensing stations, an upstream station A and a downstream station B. The stations A and B are mutually spaced by a predetermined distance in the direction of movement of the cable 1 relative to the guide.

At each of the stations A and B there is a detector in the form of an electrostatic charge sensor Ra,Rb. Each sensor Ra,Rb is adapted to generate an electrical signal whose magnitude represents the magnitude of the electrostatic charge on the surface of that section of cable immediately adjacent to the sensor. An analogue/digital converter Sa,Sb is coupled to the output of each sensor Ra,Rb.

The converters Sa,Sb are activated by pulses derived from a clock pulse generator 3. Pulses from the generator 3 are applied to the converters Sa,Sb via divider 5 which gives output pulses at the clock frequency divided by the number of computed correlation points.

Connected to the converters Sa,Sb are first and second correlating means.

Thus, an output of the upstream converter Sa is connected to a first stage in a delay line D1 of the first correlating means. A first multiplier 7 associated with the delay line D1 has a first input connected directly to an output of the converter Sb at the station B. A second input to the multiplier 7 is connected to a switch 9 adapted, in use, to connect the multiplier 7 sequentially to the converter Sa at the station A and then to each of the locations in the delay line D1. The switch 9 is connected to the clock pulse generator 3 and produces a sequence of address signals for addressing each of the stages in the delay line D1. When a location is read, the data stored at that location is applied to the second input to the multiplier 7.

The output of the converter Sb is also connected to a first stage in a delay line D2 of the second correlating means. A second multiplier 11 has a first input connected to the output of the converter Sa at the Station A and a second input which, in use, is connected sequentially via a switch 13 to the converter Sb and to respective stages in the second delay line D2.

Pulses for operating the switches 9 and 13 are obtained directly from the above-mentioned clock pulse generator 3. The connection to the second input of each multiplier 7, 11 is switched therefore at the clock frequency.

Outputs from respective first and second multipliers 7 and 11 are applied to a subtractor circuit 19, whose output is connected via a switching circuit 25 to a correlator store 23.

The switching circuit 25 serves to sequentially connect the output of the subtractor circuit 19 to respective stages in the store 23, such that the output of the circuit 19 is added to the content of a location in the store 23 corresponding to the delay selected by the switches 9 and 13.

Further circuits, not shown, are provided for applying address clock pulses to the store 23 so that the contents are scanned in sequence.

Finally, a microcomputer, also not shown, is provided for analysing data in the store 23, fitting this data to a curve, and calculating the peak location, and hence the velocity of the cable, from a knowledge of the spacing of sensors Ra and Rb.

In use of the present apparatus, electrostatic charges on the covering of the cable 1 are sensed by each of the detectors Ra,Rb, as mentioned above. The associated converter Sa, Sb then produces a signal whose magnitude represents the instantaneous magnitude of the noise signal received from the detector Ra,Rb. Sampling by each converter is effected at the clock frequency divided by the divider 5 value at a frequency appropriate to the signal spectrum satisfying the Nyquist Sampling Theorem. The signals produced by each of the converters Sa,Sb are applied to respective delay lines D1 and D2 where they are clocked from one stage to the next at the clock frequency.

As also described above, the first multiplier 7 has an input connected directly to the output of the converter Sb and a second input connected sequentially to the output of the converter Sa and to the various stages in the first delay line D1. The connections to the second input of the multiplier 7 are switched at the clock frequency. Accordingly, the output signal from the converter Sb remains at the same logic condition for sufficient time for this output to be multiplied sequentially by the output signal from the converter Sa and then by each of the values in the various stages of the first delay line D1. This means that a sequence of signals is produced at the output of the first multiplier 7, the first signal in the sequence representing the product of the output signals from the converters Sa and Sb and each of the remaining signals in the sequence representing the product of the output signal from the converter Sb and a signal previously applied from the converter Sa to the first delay line D1 for progressively increasing lengths of time. The sequence of signals from the first multiplier 7 is therefore data from which a correlation curve $R_{vw}(\tau)$ can be produced.

Data suitable for producing a correlation curve is likewise obtained at the outputs of the second multipliers 11. In the case of the multiplier 11, however, correlation is effected between signals obtained directly from the sensor Ra and delayed signals from the sensor Rb. Accordingly, the sequence of signals from the multiplier 11 represent data from which a correlation curve $R_{wv}(\tau)$ or $R_{vw}(-\tau)$ can be produced.

In the subtractor circuit 19, each signal from the second multiplier 11 is subtracted from the signal generated at the same time by the first multiplier 7. A signal representing the difference between the two signals appears at the output of the circuit 19 and the sequence of signals at the output of that circuit is applied via the switching and adding circuit 25 to the respective locations in the correlation store 23. The circuit 25 reads the contents of a location in the store 23, adds on the appropriate value at the output of the circuit 19, and then writes the new amount into the store 23. There is therefore built up in the correlation store 23 data suitable for plotting a combined curve $R_{vw}(\tau)-R_{wv}(\tau)$. In fact, in preparing such a curve, the magnitude of the contents in each of the locations is plotted as the ordinate to provide one point on the curve and the abscissa of the point is the delay time between each pair of signals whose product has been applied to that location.

Once the peak of the cross-correlation curve is known the time delay $\tau_m$ at which the peak occurs enables the flow velocity to be found from the equation $U = L/\tau_m$, where L equals the spacing between the sensors Ra and Rb and $\tau_m$ is time delay corresponding to the peak value of the cross-correlation curve found from the curve fitting routine analysis.

A second embodiment of the invention relies upon the generation of data suitable for producing the cross-correlation function $R_{vw}(\tau)$ and an auto-correlation function $R_{vv}(\tau)$ or $R_{ww}(\tau)$. These two functions are given by $$R_{vw}(\tau) = R_{xy}(\tau) + R_{cc}(\tau)$$

and $R_{vv}(\tau) = R_{xx}(\tau) + R_{cc}(\tau)$

Accordingly, $$R_{vw}(\tau) - R_{vv}(\tau) = R_{xy}(\tau) + R_{cc}(\tau) - R_{xx}(\tau) - R_{cc}(\tau)$$
$$= R_{xy}(\tau) - R_{xx}(\tau)$$

$R_{xx}(\tau)$ is often a narrow peak at the origin $\tau=0$. Accordingly, the required peak, which is often clear of the origin, can be extracted from $R_{vw}(\tau)-R_{vv}(\tau)$. This is equal to $R_{xy}(\tau)$, which is the required function.

In the present embodiment, the connections to the second delay line D2 of FIG. 3 are changed so that data for producing an autocorrelation function of the original v(t) from the detector Ra are produced. This data is then subtracted from the data supplied by the multiplier 7 and applied via the switching circuit 25 to the store 23.

Figure 4:
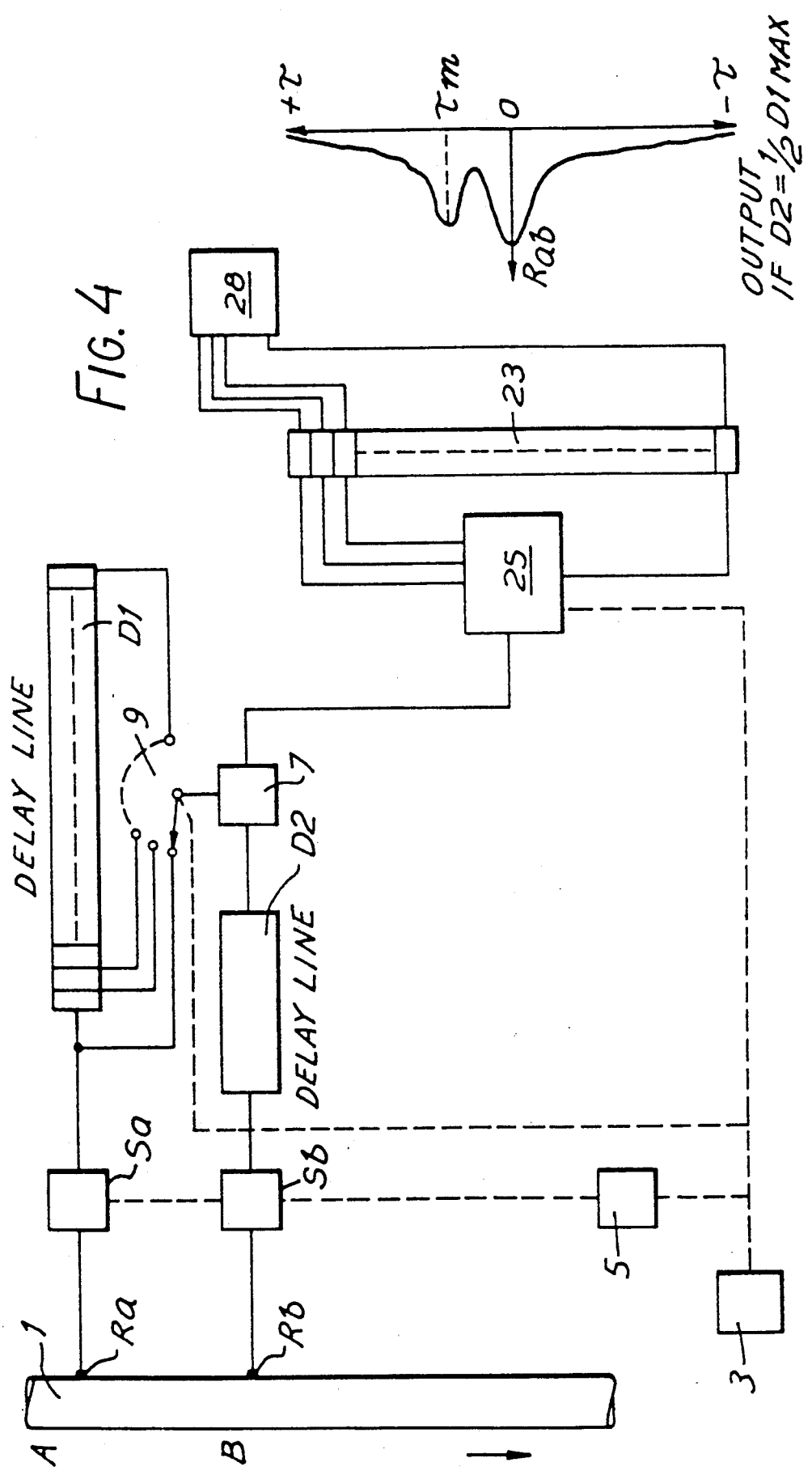

FIG. 4 of the drawings shows a further apparatus according to the invention in which the two correlating means of FIG. 3 are replaced by a single correlating means.

In the apparatus of FIG. 4, the converter Sa at the upstream station A is again connected to a first stage in a delay line D1 of the correlating means and a first input of a multiplier 7 is again connected via a switch 9 adapted, in use, to connect the multiplier sequentially to the converter Sa and then to each of the locations in the delay line D1. However, and output of the converter Sb at the downstream station B is connected via a delay line D3 to a second input of the multiplier 7. An output of the multiplier 7 is connected directly to the switching and adding circuit 25, whose outputs are connected to respective inputs to a correlator store 23.

The delay line D3 of FIG. 4 contains only half as many locations as the delay line D1. Accordingly, when the first input to the multiplier 7 is connected to a central location in the delay line D1, the signals applied to the multiplier 7 from respective delay lines D1 and D2 have each been subjected to the same delay. When the first input to the multiplier 7 is connected to any location in a second half of the delay line D1, the signal applied to the multiplier from that delay line has been delayed by a longer time than the signal applied to the multiplier from the dealy line D3. First, data generated by the multiplier 7 is then data which is suitable for producing a positive time cross-correlation curve. On the other hand, when the first input to the multiplier 7 is connected to a location in the first half of the delay line D1, the signal applied to the multiplier from that delay line has been subjected to a shorter delay than the signal from the delay line D3. Second data generated by the multiplier 7 is then data which is suitable for producing the equivalent of a negative time cross-correlation curve.

In the computer circuit 28 the second data from the store is reversed and the reverse data is subtracted from the first data to produce a combined correlation curve which is of half the length of the delay line D1.

It will be appreciated that the first correlating means in the apparatus of FIG. 3 generates data suitable for producing a positive time correlation curve from the first signal (from converter Sa) and the second signal (from converter Sb). The second correlating means generates data for producing a positive time correlation curve from the second and first signals, which is equivalent to a negative time correlation curve from the first and second signals.

The second embodiment of the invention can be modified to generate data suitable for producing an autocorrelation curve from the second signal (from converter Sb) instead of the first signal (from converter Sa).

Instead of generating data suitable for producing correlation or autocorrelation curves by effecting variable delays in the first or second signals, an apparatus can be designed to process data in the frequency domain using, say, Fourier transform techniques. One power spectra is then subtracted from the other. The desired time delay can be obtained from inverse Fourier transforms, which produce a cross-correlation curve, or directly from the slope of the phase frequency spectra.

The apparatus of FIG. 3 was used to measure the speed of travel of a cable with the detectors Ra and Rb at various spacings from the path of the cable. The arrangement was such that the cable performed oscillations and vibrations in which there were large lateral movements away from the desired path. A known apparatus, which did not include means for reducing or eliminating common mode interference, was also used to effect similar measurements under similar conditions. Significant reductions were obtained in the errors in the measurements of velocity as a function of the spacing of the detectors from the cable.

Use of the apparatus described above also reduces common-mode mains interference, which normally manifests itself as a sinusoidal wave on the correlation curve. This allows the apparatus to be used in applications where cross-correlation could not be used previously, for example with many non-earthed conductor cable lines.

In measurements of the flow rate of a fluid the blades of a pump driving the fluid may generate acoustic shock waves, which travel at the speed of sound. If ultrasonic transducers are used to sense disturbances in the fluid these shock waves produce a common mode interference similar to common mode mains interference. Again, use of an apparatus according to the invention reduces or eliminates such interference.

It will be appreciated that when used for measurements of flowrate, ultrasonic, nucleonic, conductivity, electrostatic, reluctance, nuclear magnetic resonance or electromagnetic, transmitters and receivers may be used to sense disturbances in the fluid.

Finally, other embodiments of the invention are used for reducing common mode interference in ranging systems employing cross-correlation such as radar or sonar.

I claim:

1. Apparatus for processing a first signal and a second signal, the second signal representing information delayed in time with respect to corresponding information represented by the first signal, and there being included in each signal a common mode interference signal, the apparatus comprising correlating means for generating first data suitable for producing a positive time correlation curve from the first and second signals and second data suitable for producing the equivalent of a negative time correlation curve from the two signals or an autocorrelation curve from one of the two signals, there being included in the first and second data common data which results from the common mode interference signals, and a means for subtracting one of the first and second data from the other of the first and second data, whereby the data resulting from the the said common mode interference signals is removed or reduced.

2. Apparatus as claimed in claim 1, wherein the second correlating means comprise a first correlator for generating the first data and a second correlator for generating the second data.

3. Apparatus as claimed in claim 1, wherein the correlating means comprise a correlator to which the first signal is applied directly and to which the second signal is applied via a delay line.

4. Apparatus as claimed in claim 2, wherein the or each correlator comprises a delay line for storing a series of bits of information each representing an instantaneous value of a first or second signal applied to an input of the delay line, and a multiplier having a first input for receiving the first or second signal.

5. Apparatus as claimed in claim 1 for use in measuring the velocity of relative movement between first and second bodies or between a first body and a fluid, the apparatus further comprising first and second detectors which are each adapted to sense noise signals representing disturbances in the fluid or on the second body and which, in use, are mounted at respective locations in the first body which are mutually spaced in the direction in which the said relative movement takes place, the first and second signals being noise signals detected by respective first and second detectors.

6. A method for processing a first signal and a second signal, the second signal representing information delayed in time with respect to corresponding information represented by the first signal, and there being included in each signal a common mode interference signal, the method comprising generating first data suitable for producing a positive time correlation curve from the first and second signals, generating second data suitable for producing the equivalent of a negative time correlation curve from the two signals or an autocorrelation curve from one of the two signals, there being included in the first and and second data common data which results from the common mode interference signals, and substracting one of the first and second data from the other of the first and second data, whereby the data resulting from the said common mode interference signals is removed or reduced.

* * * * *